Dec. 3, 1968 G. HOFFMANN ET AL 3,414,809
METHOD AND APPARATUS FOR MEASURING GROUP DELAY OVER FOUR-POLE
NETWORKS BY USING A SINGLE IDENTIFICATION FREQUENCY WITH NO
NEED FOR AN ADDITIONAL REFERENCE CONNECTION
BETWEEN SENDER AND RECEIVER
Filed July 9, 1965 3 Sheets-Sheet 1

INVENTORS
Günther Hoffmann
Frank Coenning

BY *Krafft & Wells*
ATTORNEYS

United States Patent Office 3,414,809
Patented Dec. 3, 1968

3,414,809
METHOD AND APPARATUS FOR MEASURING GROUP DELAY OVER FOUR-POLE NETWORKS BY USING A SINGLE IDENTIFICATION FREQUENCY WITH NO NEED FOR AN ADDITIONAL REFERENCE CONNECTION BETWEEN SENDER AND RECEIVER
Günther Hoffmann, Eningen unter Acholm, and Frank Coenning, Reutlingen, Germany, assignors to Wandel u. Goltermann, Reutlingen, Germany
Filed July 9, 1965, Ser. No. 470,828
Claims priority, application Germany, Aug. 8, 1964, W 37,350
18 Claims. (Cl. 324—57)

ABSTRACT OF THE DISCLOSURE

A method and apparatus for measuring group delay over four-pole networks with no need for an additional reference connection between sender and receiver by using a single identification frequency which is generated by an auxiliary oscillator at the sending station and also by a separate oscillator at the receiving station which operate at higher frequencies and which are connected in each case to a frequency divider to produce the identification frequency, a lower reference frequency and still lower auxiliary frequencies, all of which are in harmonic relationship with the identification frequency.

---

Figure 1:
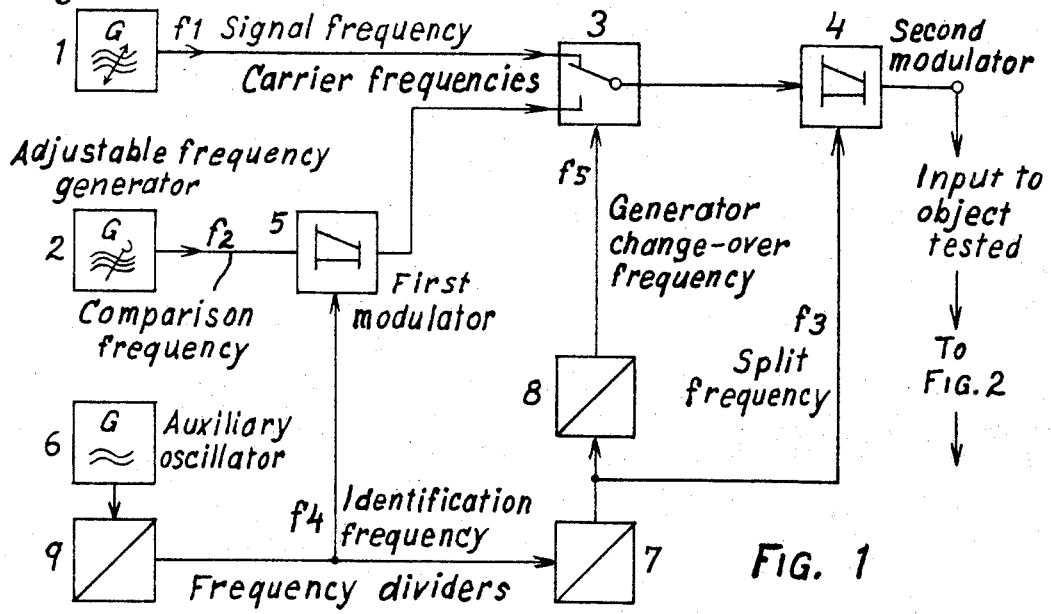

This invention pertains to a method and apparatus for measuring of the delay suffered by groups of frequencies when these are transmitted over a line of substantial length.

To assess the transmission quality of a long-distance communication path, various properties of this path have to be measured. An essential measure of the distortion of the signal in transmission is the phase angle between the voltages across the input and the output of a transmission system. As it is difficult to measure the phase angle of frequencies in a wide band and over long distances, the quantity conventionally determined for this purpose is the so-called group delay $tg$ which is defined as the first derivation of the phase angle $db$ with respect to the transmission frequency: $tg=db/d\Omega$. Knowledge of the group delay permits assessment of the phase variation and transients in a communication path and prediction of the distortion to be expected in a frequency-modulated transmission.

Virtually all known group-delay measuring sets are based on the method provided by H. Nyquist and S. Brand: Measurements of Phase Distortion; Bell Syst. Tech. Journal 9 (1930) p. 522. According to this method, the phase shift suffered by the envelope of an amplitude-modulated signal is a measure of the group delay of the object tested. In the measuring operation based on this method, a voltage of the frequency $\Omega$ is amplitude-modulated with the so-called split-frequency $\omega_s$; a frequency spectrum comprising the carrier frequency $\Omega$ and the upper and lower sidebands is applied to the object under test. The signal appearing across the output of this object displays the well-known phase shift by the angle $$\Delta b = \frac{1}{2}(b_{\Omega+\omega_s}-b_{\Omega-\omega_s})$$

referred to the original generator signal. The group delay is proportional to the angle $\Delta b$ which can be measured across the output of the object tested and compared with a reference phase derived from the object input signal: $tg=\Delta b/\omega_s$. In practice, then, group-delay measuring by the Nyquist method consists of measuring the phase angle at the modulating split-frequency $\omega_s$ which should be sufficiently low as compared with the carrier frequency $\Omega$. As a collateral requirement, the measuring equipment should measure the phase with a high accuracy if very small changes of group delay are to be measured with a low split-frequency; this high-accuracy requirement particularly refers to stable equipment conditions over sizable periods of time.

In transmission-line measurements where the input and the output of the object under test are widely separated in distance, it is not possible to derive the reference phase only from the remote input; rather, it has to be generated once more at the location of the object output. In this case it is particularly difficult to meet the requirement for long-time stability of the phase-measuring equipment.

The German Patent 1,025,072 covers a group-delay measuring method where these difficulties are avoided. However, even this method has disadvantages. One of these disadvantages is the necessity of providing a relatively large number of auxiliary frequencies: the modulating frequency (split-frequency), a frequency for the constant transfer from the signal to the reference (change-over frequency) and another frequency for the identification of the second carrier (identification frequency) are required. If as in the measuring systems so far known, all these frequencies are generated independently of one another, combination frequencies can be generated by non-linearities in the object or in the measuring equipment. These combination frequencies can be close to the split frequency and will form beats. Such beat frequencies can be so low that the resulting interference voltages cannot be filtered out. Consequently, measuring errors are obtained, and for the individual frequencies these errors change with time because of changes in the generators which are independently provided for the auxiliary frequencies.

Another disadvantage becomes apparent when an object is to be tested in a certain frequency bandwidth. In this method of measuring, the signal frequency is continuously changed or swept (wobbled) through the frequency band of the object tested to save the time that would be needed in a point-by-point plotting operation. It is now impossible to make the sweep frequency as high as desired because the transients have to be taken into account. Moreover, the periodic change-over between the signal frequency and the secondary-carrier frequency (for comparison) requires twice as much time as in a method where this changeover operation is not provided; when the frequency band of the object tested is wide, the overall measuring time is thus very long and inconvenient. An inconvenient loss of time is also experienced where the object has a transmission band of low frequencies and the sweep frequency therefore has to be made very low to avoid disturbance by transients.

It is the object of the present invention to avoid the disadvantages described above. Using the modified Nyquist measuring method of changing over between two carrier frequencies periodically, all needed auxiliary frequencies, namely the split-frequency, the identification frequency and the change-over-frequency are derived from a single comparison frequency at the sending and receiving stations, thus avoiding the disadvantages caused by the combined instabilities of several independent frequency generators.

It is another object of this invention to provide a method in which the measuring equipment of the receiver is connected to the object only for a fraction of the half period of the change-over-frequency, thus avoiding the undesirable effects of transients.

A further object of this invention is to provide a signal for gating out the said fraction of the half period of the change-over-frequency in such a way that this signal is combined in a coincidence circuit with auxiliary frequencies in fixed phase relation to one another.

One feature believed to be characteristic of this invention is the derivation from one single frequency of all auxiliary frequencies, namely, the split frequency, the change-over frequency, and the identification frequency so that all these auxiliary frequencies have a phase-locked relationship that is fixed and does not change in time, thus avoiding the generation of beat frequencies. More specifically, the invention provides an auxiliary oscillator mounted in the transmitter and also in the receiver and generating, for instance, the identification frequency from which the split frequecy is derived with the aid of a frequency divider while the change-over frequency is obtained from the split frequency with the aid of another divider.

Another feature of the invention is the provision of an additional frequency divider permitting the said auxiliary oscillator to be operated in a higher frequency region with increased reliability so that the various frequency dividers can then divide at the preferred ratio 1:2.

Still another feature of the present invention is the provision of a phase-locked signal that remains in a fixed relation to all other said auxiliary frequencies and can thus be reliably utilized to connect and disconnect the measuring set to and from the object measured.

Figure 2:
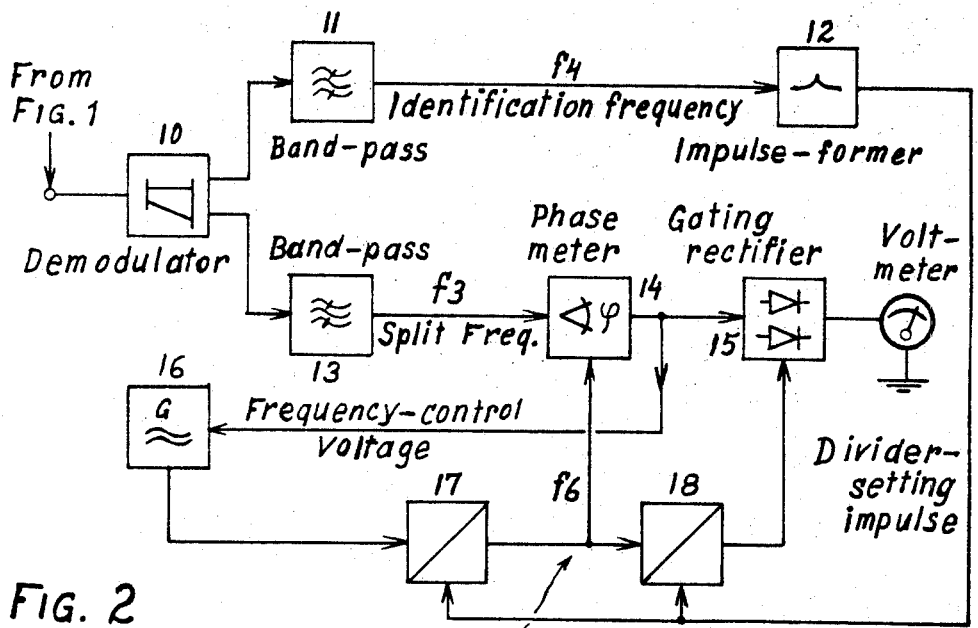
Figure 3:
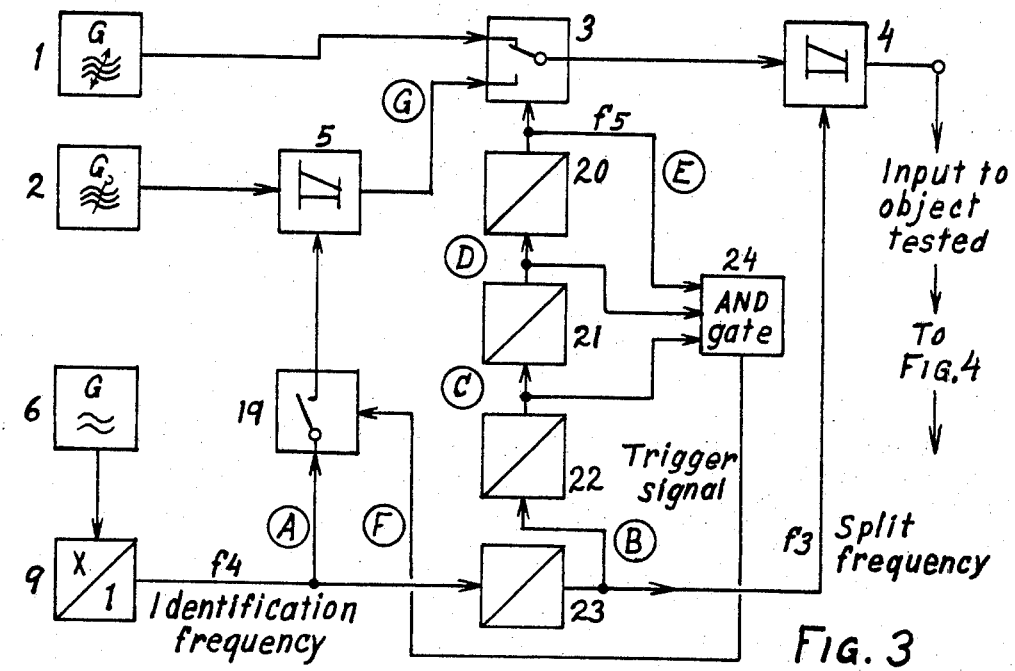
Figure 4:
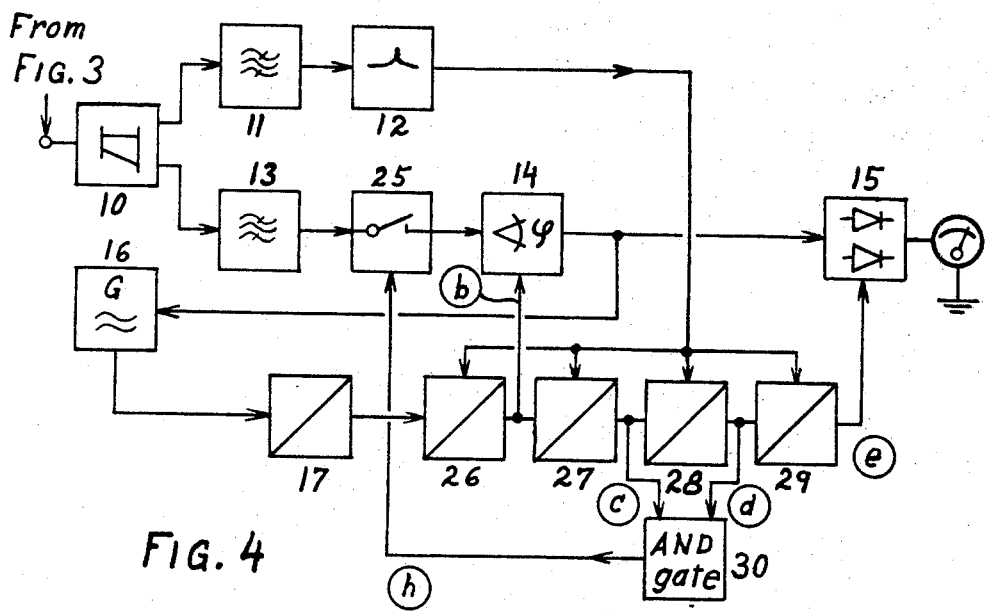
Figure 5:
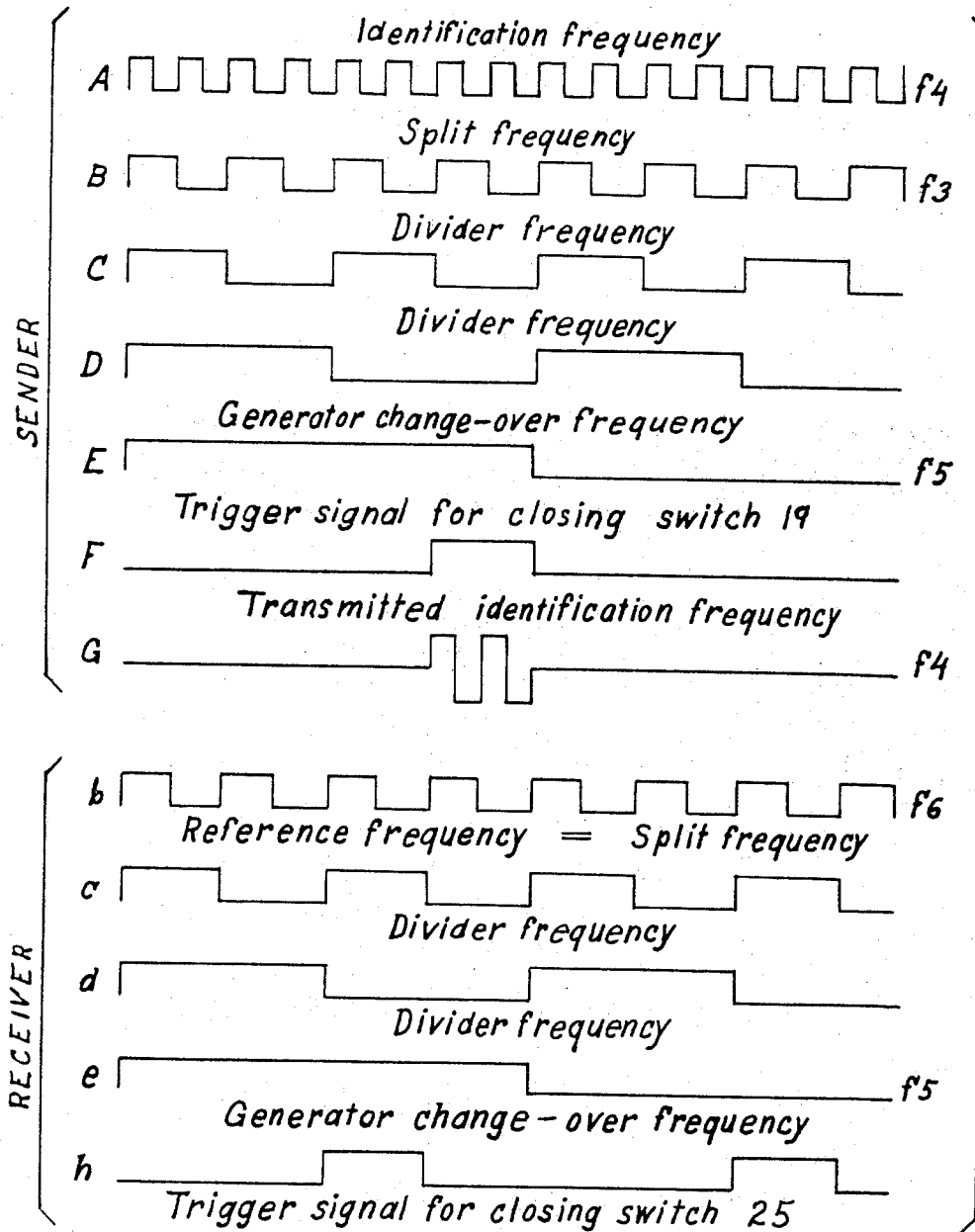

The individual and combined effects of these features will become apparent in a more detailed description of some embodiments in the following specification referring to the attached drawings in which FIGURE 1 is the generator block diagram of a measuring equipment in accordance with the present invention, FIGURE 2 is the receiver block diagram of the said equipment, FIGURE 3 is the generator block diagram of another embodiment of this invention, FIGURE 4 is the receiver block diagram of the embodiment cooperating with the generator indicated in FIGURE 3, FIGURE 5 is a time schedule indicating the on and off states of the various frequencies, obtained through the interworking of the single-source frequencies in accordance with this invention.

In the block diagram of FIGURE 1, generator 1 provides the signal or measuring frequency $f_1$ while generator 2 supplies the secondary frequency $f_2$ for comparison. Generator 1 is preferably capable of being swept through a given frequency range by automatic means of known design while generator 2 is preferably adjustable manually. Both frequencies $f_1$ and $f_2$ are applied via change-over switch 3 to modulator 4 where they are amplitude-modulated with the split frequency $f_3$ before they are fed to the object under test. To distinguish $f_1$ from $f_2$ in the receiver at the remote end of the object tested, an identification frequency $f_4$ is admixed in a well-known way to $f_2$ with the aid of modulator 5 in order to have in the receiving apparatus of FIGURE 2 a control by which the signal and comparison frequencies $f_1$ and $f_2$ can be determined on arrival. After demodulation in the demodulator 10 of the receiver, not only the split frequency $f_3$ but also the identification frequency $f_4$ is available at the output of corresponding bandpass filters 13 ($f_3$) and 11 ($f_4$).

The important difference between the method in accordance with this invention and previous methods of measuring the group delay is the derivation of each one of the auxiliary frequencies, namely, the split frequency, the change-over frequency, and the identification frequency, from only one single frequency so that all these frequencies have a fixed phase relationship that does not change in time. For this purpose, an auxiliary oscillator 6 is provided and generates the identification frequency $f_4$ in the embodiment illustrated by FIGURE 1. The frequency divider 7 is provided to derive from $f_4$ the split frequency $f_3$ while another frequency divider 8 derives from $f_3$ the change-over frequency $f_5$. In this embodiment it has been deemed advisable to provide also a frequency divider 9 to permit operation of the auxiliary oscillator 6 in a higher frequency range where the technical difficulties are more readily manageable. The use of binary frequency dividers, producing the dividing ratio 1:2, is preferable for any embodiment in accordance with the present invention.

FIGURE 2 shows schematically the receiver for cooperation with the generator of FIGURE 1. The main part of this receiver is the phase meter 14 which needs a so-called reference signal frequency $f_6$ for its operation. The reference frequency $f_6$ should exactly correspond to the split frequency $f_3$ and should be phase-stable. When the object tested is a long transmission line with the generator at one end and the receiver at the other end, the reference frequency cannot be simply taken from the generator at the sending station but must be generated in the receiver. Similarly a frequency corresponding to the generator change-over frequency $f_5$ (see FIGS. 1 and 5) has to be generated in the receiver and fed into the controlled gating rectifier 15 (see FIG. 2). Therefore the same auxiliary frequencies are again obtained in the receiver as in the sender by providing in the receiver the auxiliary oscillator 16 operating at a higher frequency from which all auxiliary frequencies are derived by frequency division.

The controlled rectifier has to detect magnitude and sign of the measuring result referenced to the comparison frequency ($f_2$). As a controlled rectifier a double balanced modulator can be used, which is being fed at one input with the signal to be rectified and at the other input with a gating signal of constant amplitude and a frequency equal to the frequency of the signal to be rectified. The amplitude of the D.C. output is proportional to the amplitude at the first input. The sign of the D.C. voltage changes between "+" and "−" if the phase between the two input signals changes by 180 degrees. The change-over frequency is used as gating signal for the controlled rectifier.

A double balanced modulator can be used as phase meter. If both inputs of the modulator are fed with square wave signals of constant amplitude and equal frequency, the D.C. output signal is proportional to the phase relationship between the two input signals.

The input signal to the receiver, obtained from the object under test, is passed through the demodulator 10 so that the split frequency $f_3$ is recovered. This $f_3$ is applied, via a bandpass filter network 13, to the first input of phase meter 14 while the auxiliary oscillator 16 feeds, through the frequency divider 17, into the second input of the phase meter 14. A frequency-control voltage derived from the output of phase meter 14 adjusts the frequency of oscillator 16 so that the split frequency $f_3$ and the reference frequency $f_6$ are equal when fed to the inputs of phase meter 14. Another frequency divider 18 fed with the split frequency $f_6$ provides the change-over frequency $f_5$ which is applied to the rectifier 15.

Before a measuring process begins, the frequency dividers 17 and 18 are automatically adjusted to a certain initial position by a setting impulse derived from the identification frequency $f_4$ (see top of FIG. 2) with the aid of the bandpass 11 and an impulse former 12. In this way, the auxiliary frequencies at the sending and receiving stations have a definite phase relationship. In a special embodiment of the receiver, it may be desirable to have an auxiliary oscillator frequency that is higher than the identification frequency, just as described with reference to the generator in FIGURE 1; in this case, all that is necessary is to provide a frequency divider 17 having a higher dividing ratio.

In still another embodiment of the present invention, the disadvantage of a long overall measuring time caused by change-over between two carriers can be reduced. After each change-over, the object tested and the measuring equipment need some time to build up to the new frequency. During this transient time, the measurement is subject to substantial interference. This effect can be reduced by providing after change-over a measuring time that is longer than the interfering transient. However, this procedure would require very long measuring times and is therefore undesirable. It is preferable according to this invention to make the measuring time very short by not measuring at all during the transient time, thereby eliminating all interference. The extremely short measuring time need not involve any more than a single zero crossing of the split-frequency voltage which is detected by accurately timed gating filters. The position of the short gating time on the time axis depends on the end of the transient and hence on the position of the change-over point on this axis. Another quantity taken into account is the phase position of the split-frequency signal referred to the change-over point. Finally, it must be known whether the primary signal carrier or the secondary reference carrier should be measured. The important point is that all these controlling quantities can be triggered at the desired times only when a known relationship exists between the phases of all auxiliary frequencies; in other words, exact timing of the quantities controlling the short gate-out time is feasible only where all auxiliary frequencies are phase-locked because one frequency is derived from another one as above described. It is possible in this manner to provide a measuring equipment of high accuracy even when long transient times have to be taken into account at low frequencies, and this accuracy is provided although the measuring time permitted at each test point is only slightly longer than the transient time.

This optimization of the measuring time can be obtained at relatively low equipment cost, as will be described now in connection with FIGURES 3 and 4. These figures are generally similar to FIGURES 1 and 2 except for the additional circuits in FIGURE 3, namely, the gate 19, the divider combination 20 to 23, and the AND gate 24 with the corresponding additional circuits in FIGURE 4, the receiver block diagram, namely, gate 25, dividers 26 to 29, and AND gate 30. Owing to the above-described defined phase relationship of the auxiliary-frequency voltages at the sending and receiving stations, the receiver is capable of sensing the time when carrier change-over occurs at the sending station. The receiver can therefore be controlled in such a way as to begin the measuring procedure only when no transient can be expected. With the highest possible change-over frequency, providing the shortest possible measuring time, the optimum solution provides for beginning the measuring process immediately after the transient has decayed to a tolerable magnitude. The measuring process must then be performed in a very short time before the next change-over occurs at the sending station. Since the measurement could also be disturbed by the identification frequency, this frequency is not transmitted during the measuring process. Rather, the transmission of the identification frequency through the object timed in such a manner that the identification signal appears in the receiver immediately after completion of the measuring process.

The functioning of circuit shown in FIGS. 3 and 4, with reference to the impulse diagram in FIGURE 5, is as follows:

A generator produces the measuring carrier frequency $f_1$, a generator 2 the comparison carrier frequency $f_2$. The signal $f_1$ is conducted directly, and the signal $f_2$ through a modulator 5 to a change-over switch 3. The output of the switch 3 is conducted to a second modulator 4. A generator 6 produces an auxiliary frequency which is converted by a frequency divider 9 into the identification frequency $f_4$. This is further divided by another frequency divider 23 to produce the split frequency $f_3$. This modulates in the modulator 4 the measuring and the comparison carrier frequencies. The split frequency $f_3$ is further divided in frequency dividers 22, 21 and 20 into the change-over frequency $f_5$ which actuates the change-over switch 3. Between the frequency dividers 22 and 21 the signal C (FIG. 5) occurs, and between the frequency dividers 21 and 20 the signal D. In a coincidence circuit 24 a trigger signal F is produced from signals C, D and change-over signal $f_5$ (E). The signal F controls a switch 19 across which the identification frequency is conducted to the modulator 5. The trigger signal F for the switch 19 closes this switch during a fraction of half the change-over frequency period, so that the comparison frequency $f_2$ is momentarily modulated with the identification frequency $f_4$ in the modulator 5.

The output signal of modulator 4 is transmitted through the object tested to the receiver in FIGURE 4 where it is first passed through the demodulator 10, from the output of which the demodulated split frequency $f_3$ is passed through a band-pass filter 13 and the demodulated identification frequency $f_4$ through a band-pass filter 11. The demodulated split frequency $f_3$ is passed through a switch 25 to a previously described phase meter 14. The second input of this phase meter is supplied with the reference frequency $f_6$ (b in FIG. 5). This frequency is obtained across the frequency dividers 17 and 26 from the auxiliary frequency that is produced by generator 16. A frequency control voltage which is taken from an output of the phase meter 14 regulates the frequency of the auxiliary generator 16 in such a manner that the reference frequency $f_6$ will be equal to the demodulated split frequency $f_3$. Over additional frequency dividers 27, 28 and 29 the change-over frequency $f_5$ is obtained from the reference frequency $f_6$ (which is equal to the split frequency $f_3$). This change-over frequency serves as a control signal for the controlled rectifier 15 which, as already stated, rectifies the output signal from the phase meter 14. The output of the controlled rectifier 15 is connected to a voltmeter.

The demodulated identification frequency $f_4$ arrives at an impulse former 12 in which an impulse is produced whereby the frequency dividers 26 to 29 are set in their operative positions so that a definite relation will exist between the phase of the change-over frequency signal E in the sender and the phase of the change-over signal $e$ in the receiver. Between the frequency dividers 27 and 28 and between 28 and 29 the signals C and $d$ are taken off to control a coincidence circuit 30, at the output of which a control signal $h$ (FIG. 5) is generated for closing the switch 25 during a fraction of half a period of the change-over frequency, with the result that the connection between the phase meter and the object being tested will be maintained only during the period when the noise resulting from the change-over switching will have passed. The phase measurement is also interrupted during the sending time of the identification frequency $f_4$ to prevent the measurements from being influenced by the identification frequency.

For a more detailed description of this operation, reference will be made to FIGURE 5 in addition to FIGURES 3 and 4. As is indicated in FIGURES 3 and 4, the control signals required for this operation are derived by coincidence from the signals of the divider combinations 20 to 23 and 26 to 29, respectively. In FIGURE 5, the identification frequency is designated by A, the split frequency by B, the divider frequencies by C, D, and the change-over frequency by E. F is the trigger signal releasing the identification frequency across gate 19; it is combined from the signals C, D, and E, working into the AND gate 24. G is the identification signal transmitted over the object under test. The signal $b$ in FIGURE 5 is the reference frequency, $c$ and $d$ are again divider frequencies, $e$ is the change-over frequency and $h$ the trigger signal, combined from $c$ and $d$, for the phase sensitive circuit 14. The actual triggering is performed in the gate 25. As in the embodiment illustrated in FIGURE 2, the receiver dividers 26 through 29 are set to a definite starting position by a setting pulse derived from the identification frequency. Due to the effect of transients, the setting pulse is somewhat delayed relative the generator signal. Thus the phase sensitive circuit 14 in FIGURE 4 is switched on or connected to the object under test only during a relatively short time in which no transient interference occurs.

It will be understood that this invention is not limited to the embodiments described and that it can be applied with advantage not only to the measuring of group-delay distortion, but also to the measuring of attenuation distortion, for instance, in which case the phase-measuring circuits at the receiver end are simply substituted by circuits responsive to the signal amplitude.

What is claimed is:

1. The method of measuring group-delay distortion appearing at the output of a four-pole network by transmitting through the network a measuring frequency $f_1$ from a sweep-frequency generator (1) alternately with a constant comparison frequency $f_2$ from an adjustable frequency generator (2) after having been amplitude-modulated by an identification frequency $f_4$ obtained from an auxiliary generator (6), the change-over from generator (1) to generator (2) being effected by a change-over frequency $f_5$ derived by frequency division from the identification frequency $f_4$, the carrier frequencies $f_1$ and $f_2$ being further amplitude-modulated by a split frequency $f_3$ that is derived by frequency division from the identification frequency $f_4$ to produce the transmitted identification frequency (G), the latter after arriving at the receiver being demodulated to obtain identification frequency $f_4$ from bandpass (11) and a split frequency $f_3$ that is delivered to a phase meter (14) together with a reference frequency $f_6$ which is equal to $f_3$ and which was obtained from an auxiliary generator (16) in the receiver, the output from the phase meter being delivered to the auxiliary generator (16) as a frequency-control voltage and also to a controlled gating rectifier (15) connected to a voltmeter, the gating rectifier (15) being controlled by the generator change-over frequency $f_5$ obtained from auxiliary generator (16) by frequency division in frequency dividers (17) and (18) that are controlled by divider-setting impulses produced by impulse-former (12) from the derived identification frequency $f_4$.

2. Method as claimed in claim 1 in which there is provided a split frequency and a change-over frequency by dividing the identification frequency.

3. Method as claimed in claim 1 in which there is provided an identification frequency derived by frequency division from a frequency higher than the identification frequency.

4. Method as claimed in claim 1 in which there is provided a gating circuit producing a control signal as a result of combining two frequencies from dividers employed to generate the auxiliary frequencies and in which this control signal determines the switching time of an electronic gate, thus determining the time in which the receiver is connected to the network.

5. Method as claimed in claim 1 in which the identification frequency is provided to cover only one fraction of the time in which the secondary carrier is transmitted through the network and in which this fraction is provided not to coincide with the measuring time of the receiver.

6. Method as claimed in claim 1 in which there is provided an identification frequency, the transmission time of which is determined by an electronic switch controlled by a signal obtained by combining the change-over frequency with the output frequencies of two dividers employed to provide the auxiliary frequencies.

7. An electrical network group delay measuring system which comprises a transmitter (FIG. 1) and a receiver (FIG. 2) adapted to be connected to opposite ends of the object to be tested, said transmitter including a sweep generator for producing measuring frequencies $f_1$ and a manually adjustable generator for producing comparison frequencies $f_2$, means including an auxiliary oscillator (6) to serve as an auxiliary frequency source for producing phase-locked auxiliary frequencies including an identification frequency $f_4$, a split frequency $f_3$ and a generator change-over frequency $f_5$, a switching means (3) operated by the change-over frequency for alternately receiving the signals from the sweep generator and from the first modulator, and a second modulator (4) receiving the split frequency $f_3$ from the auxiliary oscillator (6) and the output from the switching means (3), the output of the second modulator being adapted to be connected to one end of the object to be tested, and a receiver including a demodulator (10) with its input adapted to be connected to the other end of the object to be tested, one output of the demodulator being connected to a band-pass (11) for delivering the identification frequency $f_4$ to an impulse former (12) for setting the frequency dividers (17, 18) while another output of the demodulator is connected to a band-pass (13) for delivering the split frequency $f_3$ to a phase meter (14), the receiver also including an auxiliary oscillator (16) to serve as an auxiliary frequency source connected to frequency dividers (17, 18) for producing phase-locked auxiliary frequencies including a split frequency $f_6$ equal to $f_3$ for delivery to an input of the phase meter (14) and a generator change-over frequency $f_5$ for delivery to an input of a controlled rectifier (15) that is connected to the output of the phase meter whose output is also connected to the auxiliary oscillator for delivering a frequency-control voltage thereto, the output of the controlled rectifier being connected to a voltmeter.

8. The system as in claim 7 comprising means in the receiver to cause said receiver to be responsive to the output voltage of the object being tested for only the duration of a fraction of half of the change-over frequency.

9. The system of claim 7 comprising means for providing in said receiver a control signal for the duration of a fraction of half of the period of said change-over frequency, said control signaling means having frequency inputs derived from the auxiliary frequency source in the receiver, gating means for energizing an indicator in said receiver with said split frequency in response to said control signal.

10. The system as in claim 8, wherein the means in the receiver for deriving said identification frequency from said auxiliary frequency comprises means for dividing said auxiliary frequency which is a higher frequency than said identification frequency, and said means for driving said split frequency and said change-over frequency comprises means for dividing the identification frequency provided by said deriving means.

11. The system as in claim 8, comprising means for providing in said transmitter a control signal for the duration of a fraction of half of the period of said change-over frequency, the control signaling means having selected frequency inputs derived from said auxiliary frequency to provide a control signal which occurs at a time not to coincide with the time said receiver is responsive, means for causing said identification frequency to be transmitted in response to said control signal for only a portion of the time the modulated comparison frequency is transmitted.

12. The system as in claim 8, comprising means responsive to frequencies derived from the auxiliary frequency source in said transmitter to provide a control signal, a change-over switch responsive to said control signal to cause said identification frequency to be transmitted for the duration of said control signal, said control signal duration being a fraction of half of the period of said change-over frequency, and caused to occur after the receiver responsive duration has terminated.

13. A system for the measurement of group-delay distortion of an electrical network comprising a transmitter connectable to the input of said network, said transmitter comprising a carrier frequency source, a split frequency source, means for amplitude-modulating said carrier frequency with said split frequency, means for periodically changing said carrier frequency to provide a signal carrier frequency and a secondary carrier frequency for comparison, a change-over frequency source connected to said frequency-changing means to cause the change-over period to be that of the change-over frequency, an identification frequency source, means for modulating said secondary carrier frequency prior to its arrival at the periodically changing means with said identification frequency, a first auxiliary frequency source, means for deriving said split frequency, said change-over frequency and said identification frequency from said first auxiliary frequency source, said frequencies being locked in phase with said first auxiliary frequency, a receiver connectable to the output of said network, said receiver comprising means for demodulating said carrier frequency to derive said split frequency, a second auxiliary frequency source, means for controlling said second auxiliary frequency source by the detected split frequency, means for deriving a reference frequency equal to the said detected split frequency from the second auxiliary frequency source, means for deriving said change-over frequency from the second auxiliary frequency source, means for determining the periodic phase difference of said split frequency, said phase difference constituting a measure of the difference between the signal carrier group delay and the secondary carrier group delay, said determining means having said detected split frequency and said reference frequency as its inputs.

14. The system as in claim 13, comprising an auxiliary oscillator for providing a control signal in the receiver, means for providing a plurality of phase-locked frequencies from the second auxiliary oscillator, at least some of which are delivered to said control signaling means to provide said control signal for a particular time interval of said change-over frequency period, and means for applying said control signal to a portion of said receiver to energize that portion for only the time interval of said control signal.

15. The system as in claim 14 wherein said means for deriving said auxiliary frequency from said detected split frequency comprises a phase meter having said split frequency as one input, a voltage controlled oscillator as the source of said second auxiliary frequency, a frequency divider connected to the output of said controlled oscillator to provide another input to said phase meter, the output voltage of said phase meter being provided as an input voltage to said controlled oscillator.

16. The system as in claim 14, comprising a frequency divider connected to said second auxiliary frequency source to provide said change-over frequency at the divider output, said means for determining the periodic phase difference of said split frequency comprising a controlled rectifier having said split frequency as one input, said change-over frequency being applied as another input to said controlled rectifier.

17. The system as in claim 14, wherein said means for providing a plurality of phase locked frequencies from said second auxiliary frequency comprises a plurality of cascaded frequency dividers, comprising in addition means for setting said frequency dividers to a certain initial position during the period of each change-over frequency comprising, means for detecting said identification frequency to provide a setting pulse, said setting pulse being applied to said dividers to cause the dividers to assume said initial position on each occurrence of said setting pulse.

18. The system as in claim 17, comprising means for providing a plurality of phase locked frequencies from said first auxiliary frequency source in said transmitter, means for providing a control signal in said transmitter by combining selected frequencies of said plurality of frequencies, said transmitter control signal occurring at a time interval different from the receiver control signal, gating means responsive to said transmitter control signal to provide said identification frequency at said transmitter output only during said transmitter control signal time interval.

References Cited

UNITED STATES PATENTS

| | | | |
|---|---|---|---|
| 2,530,596 | 11/1950 | Blok | 324—57 |
| 2,700,133 | 1/1955 | Pfleger | 324—57 |
| 2,877,409 | 3/1959 | Jacobsen et al. | 324—57 |
| 2,970,258 | 1/1961 | Sinclair | 324—57 |
| 2,987,586 | 6/1961 | Berger | 179—175.3 |
| 3,358,227 | 12/1967 | Taylor | 324—57 |

RUDOLPH V. ROLINEC, *Primary Examiner.*

E. E. KUBASIEWICZ, *Assistant Examiner.*